United States Patent [19]

Schleimer et al.

[11] Patent Number: 5,700,144
[45] Date of Patent: Dec. 23, 1997

[54] METHOD AND APPARATUS FOR THERMAL TREATMENT OF SOLIDS

[75] Inventors: Friedrich Schleimer, Köln; Dieter Ameis, Dormagen, both of Germany

[73] Assignee: Klockner-Humboldt-Deutz AG, Cologne, Germany

[21] Appl. No.: 598,032

[22] Filed: Feb. 7, 1996

[30] Foreign Application Priority Data

Feb. 8, 1995 [DE] Germany ............. 195 04 082.1

[51] Int. Cl.⁶ ........................................... F27B 3/18
[52] U.S. Cl. ..................... 432/161; 110/266; 266/182
[58] Field of Search .................. 432/161; 266/236, 266/182, 200, 159, 144; 222/591, 594; 110/264, 266

[56] References Cited

U.S. PATENT DOCUMENTS 4,919,396  4/1990  Fritsch et al. .

FOREIGN PATENT DOCUMENTS 37 29 798  3/1989  Germany .

Primary Examiner—Henry A. Bennett
Assistant Examiner—Jiping Lu
Attorney, Agent, or Firm—Hill, Steadman & Simpson

[57] ABSTRACT

During thermal treatment in a melting cyclone of solids that yield molten products at treatment temperatures, an exhaust gas is separated from the melt in an apparatus following the melting cyclone. The separation of the exhaust gas is implemented in a cyclone-like separating chamber that is fashioned such that a thermal after-treatment of the melt and/or of the exhaust gas can ensue therein in addition to the separation of the exhaust gas.

16 Claims, 6 Drawing Sheets

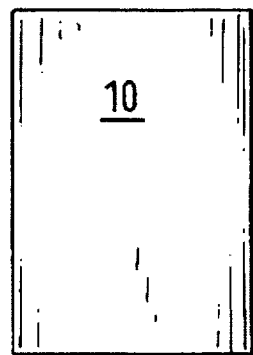
FIG.5
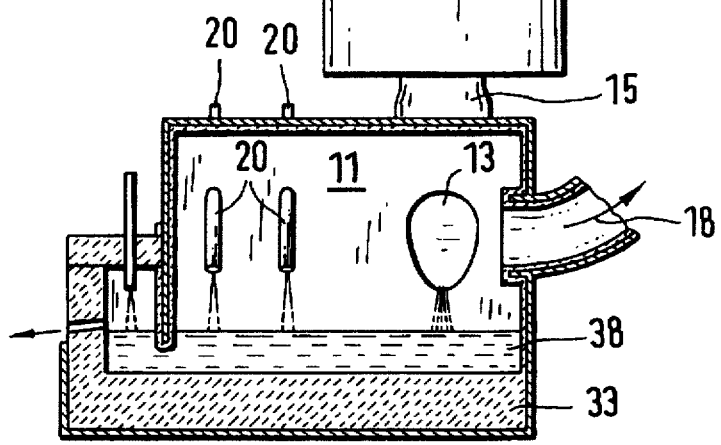
FIG.6
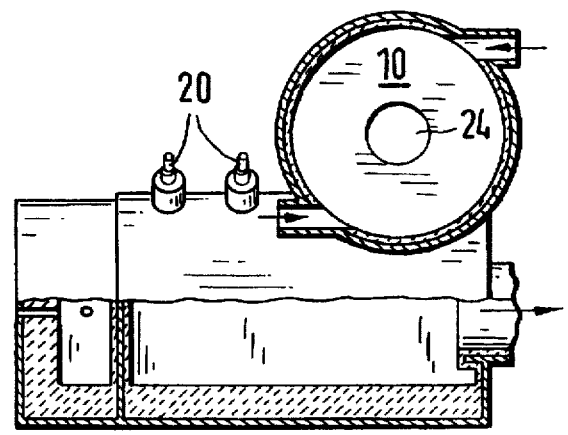
FIG.7
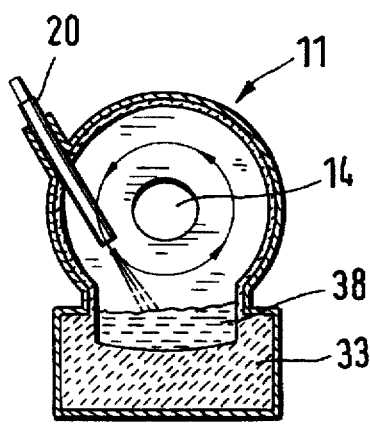

1

METHOD AND APPARATUS FOR THERMAL TREATMENT OF SOLIDS

BACKGROUND OF THE INVENTION

The invention is directed to an apparatus and to a method for high-temperature treatment of fine-grained solids such as, for example, non-ferrous metal ore concentrates, waste materials or the like that yield molten products at treatment temperatures. The apparatus has a melting cyclone and a separating chamber in which the reaction products (melt and exhaust gas) obtained in the melting cyclone are introduced and separated from one another. A transfer element connects the melting cyclone discharge to the admission opening of the separating chamber, arranged between the melting cyclone and the separating chamber.

German Published Application 37 29 798 discloses an apparatus for smelting meltable substances wherein a melting cyclone is arranged above a furnace serving as separating chamber, whereby a vertical transfer element partially introduced into the ceiling of the furnace connects the discharge opening of the melting cyclone to the admission opening of the furnace.

During operation of this known apparatus, the melt formed in the melting cyclone first flows at the inside wall of the melting cyclone and downward over the inside wall of the transfer element and subsequently drips distributed over the entire edge of the transfer element from the ceiling of the furnace into the molten bath collected below in the furnace with a great height of fall, for example 2 m.

The exhaust gas formed in the melting cyclone flows downward into the furnace in the same direction as the melt and is then laterally discharged from the furnace. As a result thereof, the exhaust gas stream crosses the drop path of the melt, and fine droplets of the melt can be entrained by the exhaust gas, and as a result the proportion of dust in the exhaust gas is undesirably increased.

A further disadvantage of the transfer element which is vertically introduced into the furnace ceiling is that during necessary repair work the entire cyclone must be removed first at the transfer element and must then be put back in place on the transfer element later, resulting in a disproportionately high repair cost.

SUMMARY OF THE INVENTION

An object of the invention is to provide an apparatus and a method such as disclosed by DE 37 29 798, the apparatus composed of a melting cyclone and a furnace, which implements the thermal treatment of fine-grained solids yielding molten products at treatment temperatures while avoiding the aforementioned disadvantages. A farther-reaching thermal treatment of the products produced in the melting cyclone can be implemented.

The stated object is achieved with an apparatus for high-temperature treatment of fine-grained solids having a melting cyclone and a separating chamber in which the reaction products obtained in the melting cyclone are introduced and separated from one another, whereby a transfer element that connects the melting cyclone discharge to the admission opening of the separating chamber is arranged between the melting cyclone and the separating chamber. The melting cyclone is arranged such that the transfer element leads from an underside of the melting cyclone vertically obliquely downward in a curved path to the admission opening of the separating chamber. The separating chamber is fashioned cyclone-like and the admission opening is arranged laterally oriented for receiving the reaction products immediately above a surface of a molten bath of melt contained therein. An axial discharge opening for the exhaust gas, and a discharge opening for the melt are provided.

Also, the object is achieved by a method for the high-temperature treatment of fine-grained solids that yield molten products at treatment temperatures. The reactions products of melt and exhaust gas are discharged from the melting cyclone and are conducted obliquely downward into the separating chamber through the transfer element in a vertical curved path. The exhaust gas first obliquely impinges the surface of the molten bath jet-like at high speed and, due to the cyclone-like form of the separating chamber, is then helically conducted through the separating chamber to the exhaust gas discharge opening.

As a result of the inventive arrangement of the transfer element, the melt formed in the melting cyclone, which flows downward out of the discharge opening of the melting cyclone into the transfer element, is enriched or concentrated in the transfer element on the vertical-changing-to-curved, lower inside surface and flows into the molten bath of the separating chamber in a common stream having only a slight height of fall, whereas the exhaust gas impacts the surface of the molten bath at an acute angle largely free of melt droplets.

Due to the concentration of melt at the lower inside of the transfer element, a high-degree of separation of melt and exhaust gas already occurs in the transfer element, as a result whereof the desired, complete separation of melt and exhaust gas is promoted in the separating chamber. Since the melt flowing into the separating chamber with only a slight height of fall is now no longer crossed by the exhaust gas stream, the proportion of melt droplets in the exhaust gas is advantageously substantially lowered.

The stream of exhaust gas obliquely impinging the surface of the molten bath at an acute angle with high speed effects a turbulence in the melt similar to that effected by a top-blowing lance and produces a convective heat flow in the melt.

As a result of the separating chamber of the invention being fashioned cyclone-like, the exhaust gas is then helically guided along the inside wall of the separating chamber to the discharge opening, whereby remaining melt droplets still present in the exhaust gas are deposited at the inside wall of the separating chamber.

In summary, the apparatus of the invention is thus composed of two series-connected cyclones, whereby the desired thermal reaction with formation of the melt ensues in the first cyclone, the melting cyclone, and the thorough, complete separation of the melt from the exhaust gas ensues in the second cyclone, in which a thermal after-treatment of the melt and/or exhaust gas is additionally implemented.

According to an advantageous development of the invention given a horizontally arranged separating chamber with horizontal axis: the admission opening of the separating chamber is arranged in the region of the exhaust gas discharge opening in order to implement a thermal after-treatment of the melt in the region of the separating chamber between the admission opening and the melt discharge opening that is largely free of exhaust gas, for example with top-blowing lances that are secantially introduced into the separating chamber in this region that is largely free of exhaust gas; or, on the other hand, the admission opening of the separating chamber is arranged in the region of the melt discharge opening in order to implement a thermal after-treatment of the exhaust gas in the separating chamber in the region between the admission opening and the discharge opening for the exhaust gas, for example an after-burning treatment with the assistance of auxiliary burners with which additional fuel is secantially jetted into the separating chamber.

According to a further advantageous development of the invention, at least one of these auxiliary burners is arranged such that the fuel or, respectively, mixture of fuel and combustion oxygen that is jetted directly impinges the melt flowing from the transfer element and thus exerts the action of a top-blowing lance on the melt.

According to the invention, the thermal after-treatment of the melt and/or exhaust gas in the cyclone-like separating chamber is not limited to a horizontally arranged separating chamber; rather, it can also be implemented in the same way in a separating chamber arranged erect with vertical axis.

According to the invention, the curvature part of the transfer element laterally connecting the separating chamber to the underside of the melting cyclone independently of the horizontal or vertical arrangement of the cyclone-like separating chamber is secured with screw-type connections, so that, when repairs are necessary at the transfer element, only this part need be removed and a time-consuming and cost-intensive removal of the melting cyclone is no longer required.

Further advantages, details and features of the invention are explained in greater detail below on the basis of exemplary embodiments shown in schematic FIGURES of the drawing.

BRIEF DESCRIPTION OF THE DRAWINGS

FIG. 5 is a longitudinal section through a horizontally arranged separating chamber with melting cyclone and devices for the thermal after-treatment of the melt;

FIG. 6 is a partially cut plan view onto the apparatus of FIG. 5;

FIG. 7 is a cross section through the apparatus of FIG. 5 with a section through a top-blowing lance;

DETAILED DESCRIPTION OF THE PREFERRED EMBODIMENTS

Figure 1:
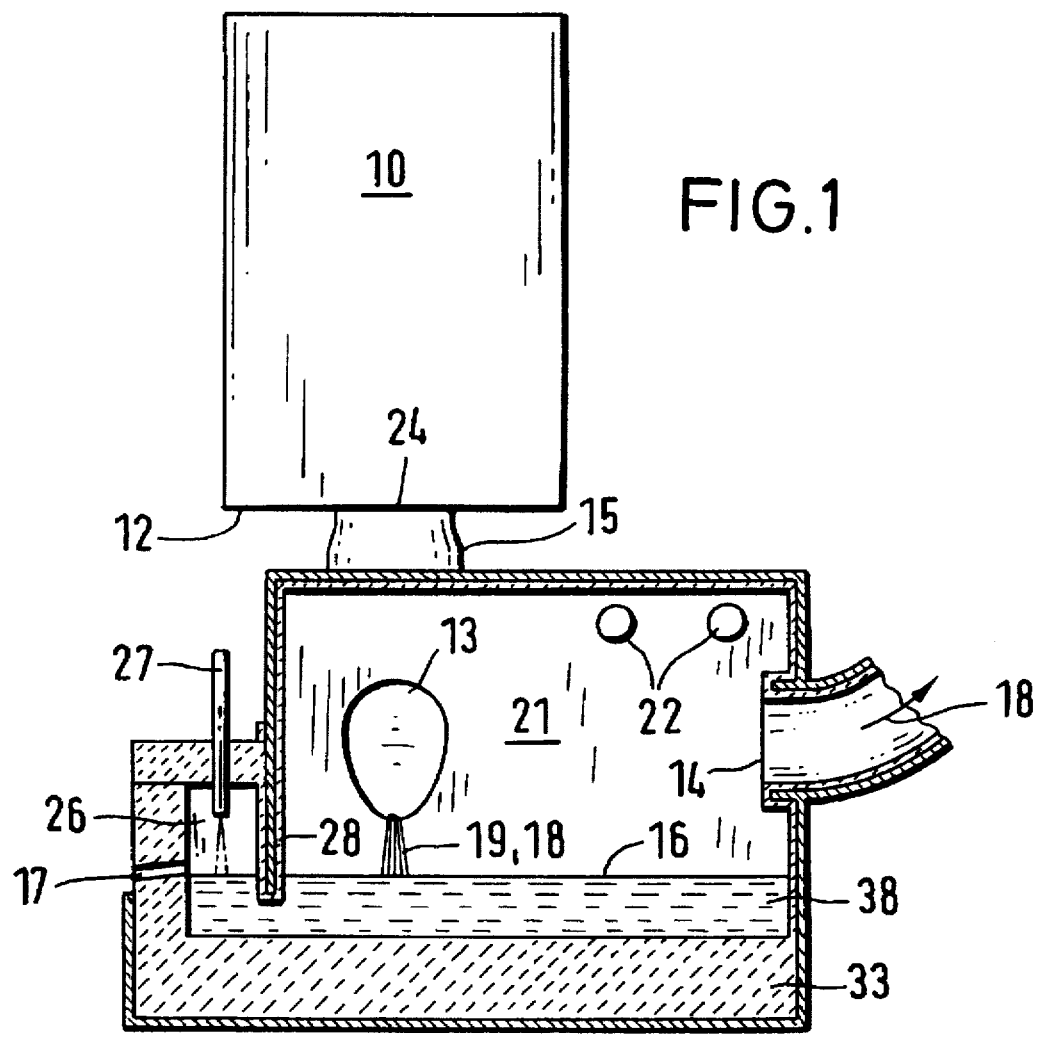
FIG. 1 is a longitudinal section through a horizontally arranged separating chamber with melting cyclone and devices for the thermal after-treatment of the exhaust gas.
Figure 2:
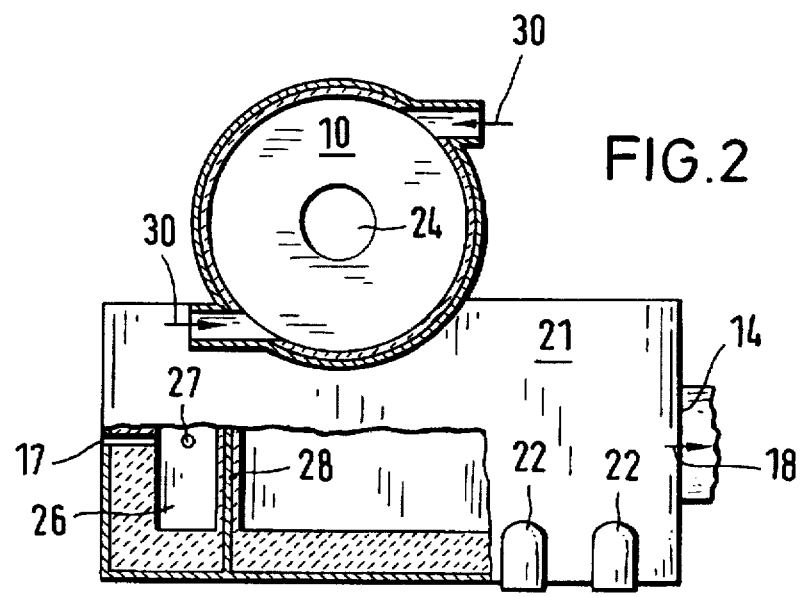
FIG. 2 is a partially cut plan view onto the apparatus of the invention.

As FIGS. 1 through 4 illustrate, the melting cyclone 10 with its secantial burner 30 for the injection of the solids to be thermally treated can be arranged laterally above a cyclone-like separating chamber 21 arranged horizontally with a horizontal axis. Also, combustion oxygen or air and potentially additional fuel can be injected therewith. An axial discharge opening 24 for the reaction products formed in the melting cyclone 10, such as melt 19 and exhaust gas 18, is arranged at the underside 12 of the melting cyclone 10 and is connected to a transfer element 15 that proceeds obliquely downward on a curved path. The reaction products are conducted by this transfer element 15 to an admission opening 13 arranged laterally at the separating chamber 21, whereby the melt 19 concentrates at the lower inside of the transfer element 15, as a result whereof a significant separation of the melt 19 from the exhaust gas 18 already ensues.

The melt 19 then flows in a locally limited stream with slight height of fall into the molten bath 38 formed of the melt 19 in the lower part of the separating chamber 21, whereas the exhaust gas 18, already largely free of melt 19, impinges the surface 16 of the molten bath at an acute angle with high speed. Due to the cyclone-like fashioning of the separating chamber 21, the exhaust gas stream 18 is redirected therefrom according to the arrow direction 29 in FIGS. 3 and 4 and is conducted to the exhaust gas discharge 14, from which it proceeds to an exhaust gas treatment means (not shown) for the purpose of, for example, cooling and dedusting.

Due to the rotation of the gases, especially of the exhaust gas 18, present in the separating chamber 21 above the molten bath 38, the melt droplets still contained in the gas stream are hurled against the inside wall of the separating chamber 21 as a result of the centrifugal force acting on them and are thereby separated from the gas stream.

The melt 19 collecting in the lower part of the separating chamber 21 forms a molten bath 38 thereat and is continuously withdrawn from the separating chamber 21 through a discharge opening 17 via the discharge region 26 fashioned siphon-like or, on the other hand, it is supplied in common with the exhaust gas 18 to some other type of discharge, for example slag granulation (not shown).

The siphon-like fashioning of the discharge region 26 is required in order to suppress an undesired emergence of exhaust gas from the discharge opening (17). To this end, a part of the separating chamber wall immerses into the molten bath 38 and forms a gas-tight termination to the discharge opening 17.

In order to maintain the continuous discharge of the melt 19, the discharge region 26 is heated with an auxiliary burner 27, so that the melt cannot "freeze" because it is separated from the hot exhaust gas stream.

In the exemplary embodiment of FIGS. 1 through 4, the admission opening 13 is arranged in the proximity of the melt discharge region 26, and two auxiliary burners 22 are secantially introduced in the upper region of the separating chamber 21 between the admission opening 13 and the exhaust gas discharge opening 14. Additional fuel and combustion oxygen or air is injected through the auxiliary burners 22 tangentially relative to the exhaust gas stream 18, as a result whereof constituent parts present in the exhaust gas are thermally after-treated (after-burned, oxidized, volatilized, etc.).

Due to the high treatment temperatures in the apparatus of the invention, melting cyclone 10, transfer element 15 and separating chamber 21 are provided with a double jacket 32 or, respectively, tubular cooling system with water cooling or vapor cooling. In addition, the separating chamber 21 has a refractory lining 33 in the region in contact with the melt 19 in order to preclude heat losses and prevent a rapid cooling of the melt 19.

Figure 3:
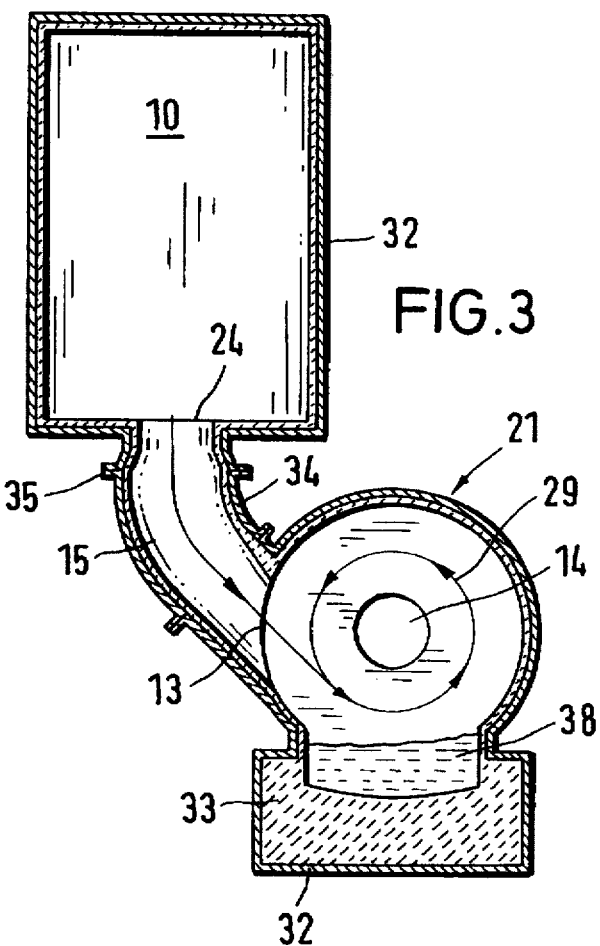
FIG. 3 is a cross section through the apparatus of FIG. 1 with a section through the melting cyclone.
Figure 4:
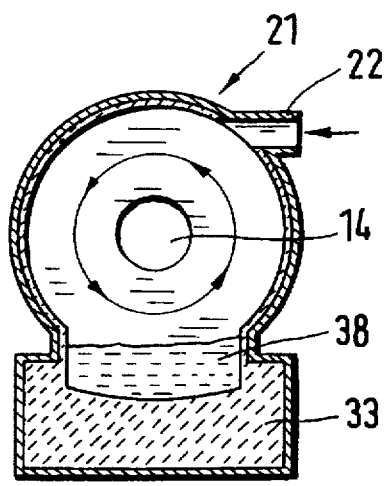
FIG. 4 is a cross section through the apparatus of FIG. 1 with a section through an auxiliary burner.

As may be particularly derived from FIG. 3, the curved sub-section 34 of the transfer element 15 is fitted with screws (not shown) via a flange connection 35. When repairs are needed, this sub-section can be laterally removed (toward the left in the drawing) without a great expenditure of time and without dismantling the melting cyclone 10 and can also in turn be laterally introduced in the same way.

Given an otherwise identical embodiment, the position of the melting cyclone 10 in the exemplary embodiment of FIGS. 5 through 7 is merely changed such relative to the separating chamber 11 so that the admission Opening 13 is now arranged in the immediate proximity of the exhaust discharge opening 14, and as a result thereof a larger region of the separating chamber 11 remains largely free of exhaust gas 18, so that this region can be used for the thermal after-treatment of the melt 19. To this end, two top-blowing lances 20 are secantially introduced into the separating chamber, these injecting a gas mixture suitable for the thermal after-treatment of the melt onto the surface 16 of the molten bath 38 at an acute angle tangentially to the gas flow 29 in the separating chamber 11.

Figure 8:
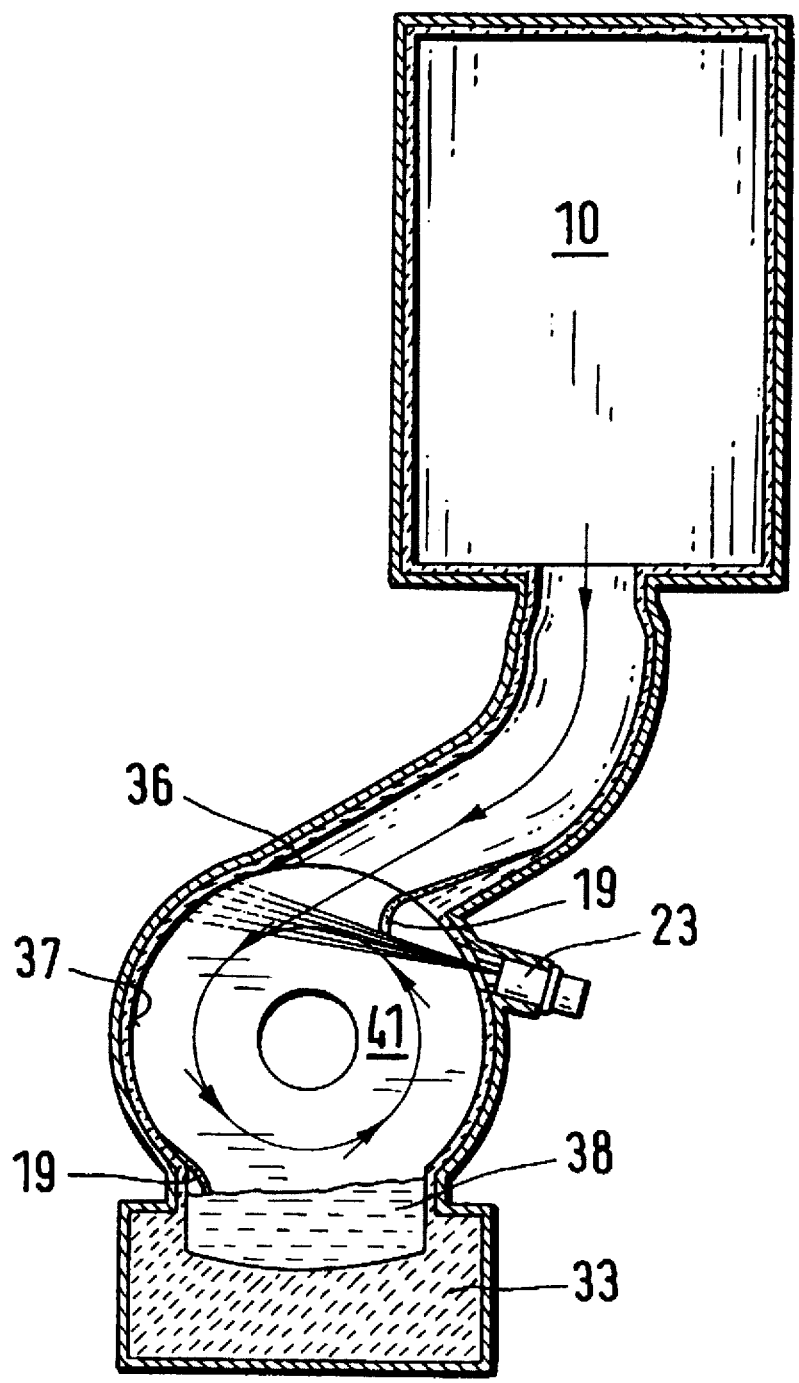
FIG. 8 is a cross section through a horizontally arranged separating chamber with melting cyclone and a device for the thermal after-treatment of the free-flowing melt.

FIG. 8 shows a topically higher arrangement of the admission opening 36 in a further exemplary embodiment. The melt 19 now no longer flows into to separating chamber 41 with a slight height of fall but from above. The active jet of a burner 23 secantially introduced in this region of the separating chamber 41 impinges the free-flowing melt 19 at a right angle, as a result whereof the latter is atomized and hurled against the inside wall 37 of the separating chamber that lies opposite the burner 23 and flows downward along this inside wall 37 into the molten bath 38 with what is now only a slight height of fall. The thermal after-treatment of the melt 19 achieved in this way is especially effective since it is not only the surface region of the molten bath 38 that is charged with the reaction gas, such as effected by the top-blowing lances 20 of FIGS. 5 through 7, but the entire melt 19, separated into fine drops, that is charged with the reaction gas of the burner 23.

Figure 9:
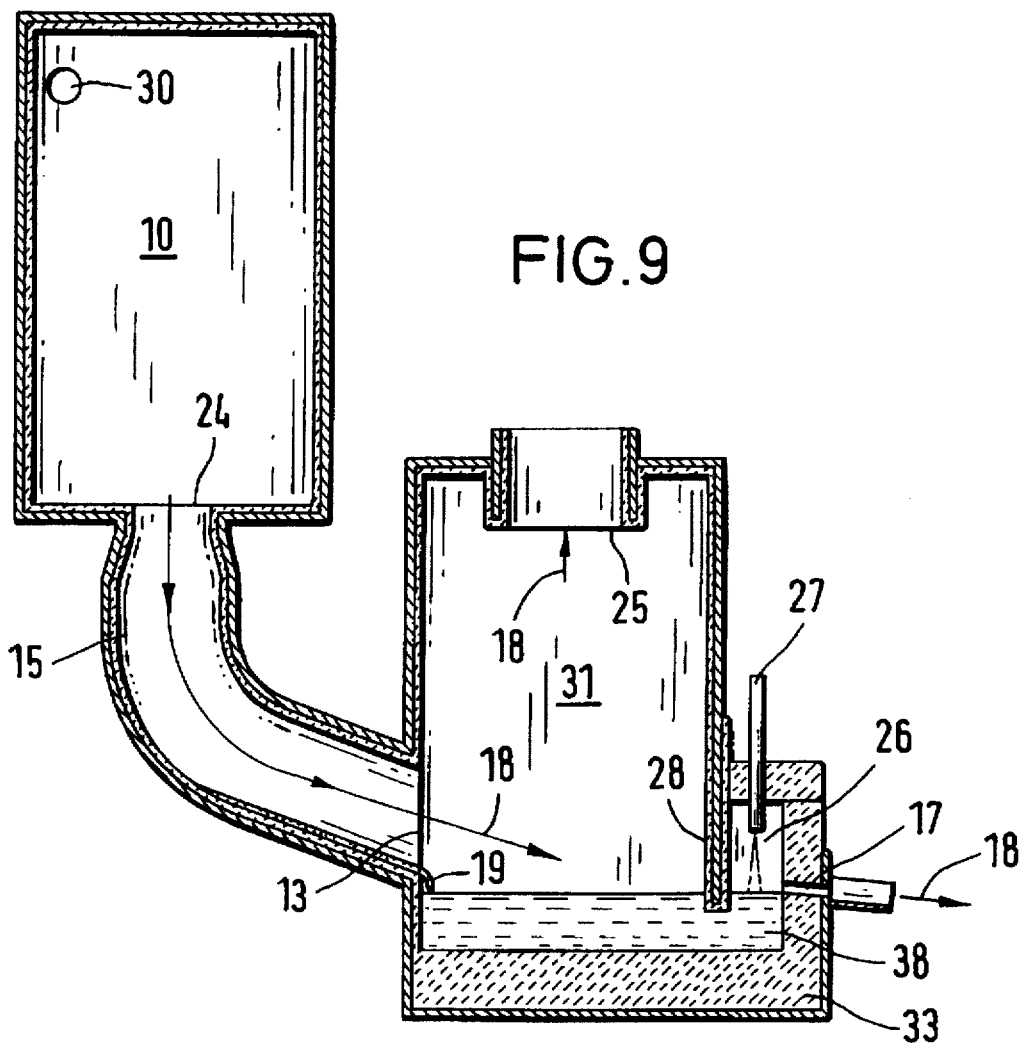
FIG. 9 is a longitudinal section through a vertically arranged separating chamber with melting cyclone.
Figure 10:
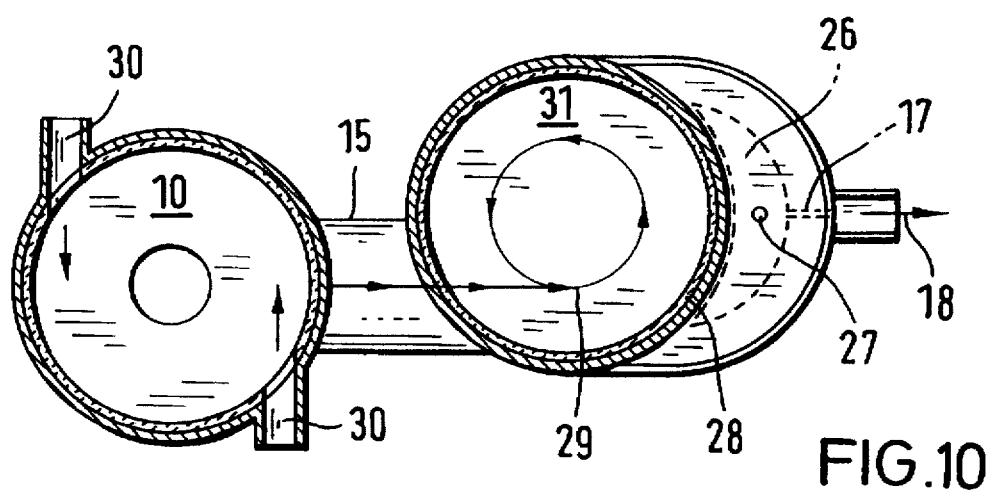
FIG. 10 is a cross section through the separating chamber of FIG. 9.

In a further exemplary embodiment of the invention shown in FIGS. 9 and 10, the separating chamber 31 is arranged vertically with a vertical axis, so that the exhaust gases 18 impinging the surface 16 of the molten bath obliquely downwardly in the separating chamber 31 are redirected in arrow direction 29 in conformity with the cyclone-like fashioning of the separating chamber 31 and are conducted to the upper exhaust gas discharge opening 25. One advantage of this arrangement is that the exhaust gas stream presses the hot melt under the separating chamber wall 28 into the siphon-like melt discharge region 26, this clearly facilitating the continuous discharge of the melt and preventing the "freezing" of the melt in this region even without an additional burner 27.

A thermal after-treatment of the melt 19 and/or of the exhaust gas 18 can also be implemented given this vertical arrangement of the separating chamber when top-blowing lances and/or burners are installed at appropriate locations of the separating chamber 31 (not shown in FIGS. 9 and 10).

The improvement of the thermal treatment overall as well as the lowering of operating costs can also already be inventively influenced by a suitable measure in the thermal treatment in the melting cyclone.

Figure 11:
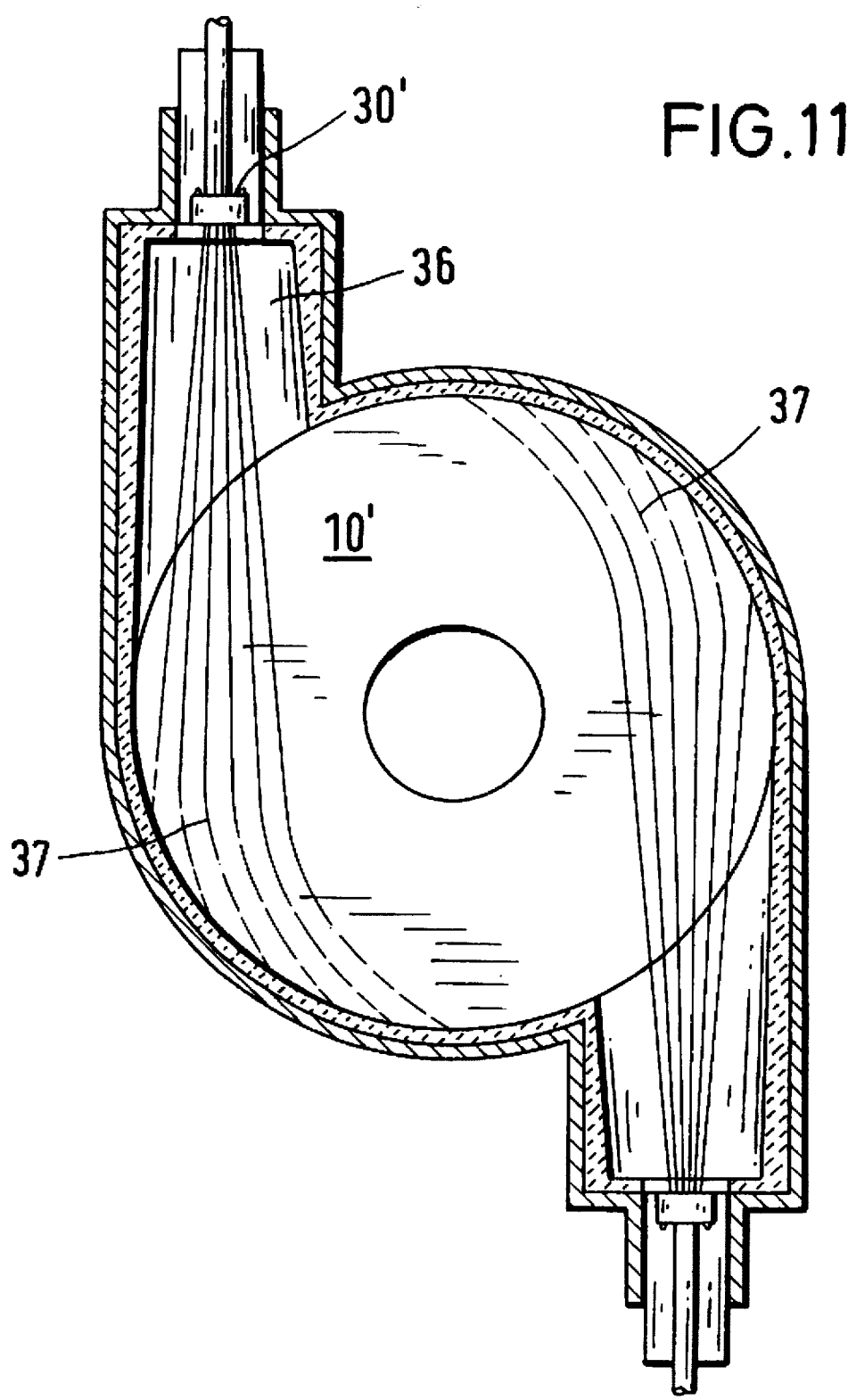
FIG. 11 is a cross section through a melting cyclone.

As shown in FIG. 11, the combustion chamber 36 with the burner 30' of the melting cyclone 10' is lengthened toward the back outside the melting cyclone 10', so that the overall firing path up to incidence of the burner jet 37 against the inside wall of the melting cyclone is lengthened.

In addition to a lengthened reaction path and, thus, improved thermic influence given coarser particles, less of a mutual influencing of the burners 30' lying opposite one another in one plane is especially achieved, as a result whereof the formation of incrustations at the burners 30' (particularly at burner orifice) as well as at the inside cyclone wall is clearly reduced.

Although the present invention has been described with reference to a specific embodiment, those of skill in the art will recognize that changes may be made thereto without departing from the scope and spirit of the invention as set forth in the appended claims.

I claim as my invention:

1. An apparatus for high-temperature treatment of fine-grained solids having a melting cyclone, and a separating chamber in which the reaction products obtained in the melting cyclone are introduced and separated from one another, comprising:

a separating chamber having a lateral admission opening;

a transfer element; and a melting cyclone arranged such that the transfer element leads from an underside of the melting cyclone vertically obliquely downward in a curved path to the lateral admission opening of the separating chamber; and said separating chamber is fashioned cyclone-like forming a curved exhaust gas path and with a lower region for holding a molten bath of liquid reaction product, said lateral admission opening adapted for receiving the reaction products immediately above a surface of the molten bath contained within said lower region, and having an axial discharge opening for the exhaust gas, and a discharge opening for the liquid reactions product.

2. An apparatus according to claim 1, wherein said lower region comprises a melt discharge region of the separating chamber, having a wall extending into the molten bath of liquid reaction product forming a submerged flow path in order to enable a gas-tight discharge of the liquid reaction product.

3. An apparatus according to claim 1, wherein the separating chamber is arranged horizontally with a horizontal axis and the admission opening is located adjacent the exhaust gas discharge opening between the melt discharge opening and the exhaust gas discharge opening lying opposite the melt discharge opening.

4. An apparatus according to claim 3, further comprising at least one top-blowing lance for thermal after-treatment of the melt and introduced into the separating chamber between the admission opening and the melt discharge opening.

5. An apparatus according to claim 3, further comprising at least one auxiliary burner secantially laterally introduced into the separating chamber such that the effect thereof corresponds to that of a top-blowing lance, and a thermal after-treatment of the melt free-flowing in the region of the burner ensues.

6. An apparatus according to claim 1, wherein the separating chamber is arranged horizontally with a horizontal axis and the admission opening is located adjacent the melt discharge opening, between the melt discharge opening and the exhaust gas discharge opening.

7. An apparatus according to claim 6, further comprising at least one auxiliary burner for the injection of additional fuel arranged in the separating chamber between the admission opening and the exhaust gas discharge opening.

8. An apparatus according to claim 1, wherein the separating chamber is vertically arranged with a vertical axis and is provided with an upper, axial exhaust gas discharge opening and the admission opening for the reaction products of the melting cyclone lies opposite the melt discharge opening.

9. An apparatus according to claim 1, wherein said transfer element has a curvature part which is detachably connected to the melting cyclone and the separating chamber by screwed connections, so that this curvature part of the transfer element can be laterally withdrawn after undoing the screws.

10. An apparatus according to claim 1, comprising burner combustion chambers that are laterally introduced into the melting cyclone and are lengthened toward the outside of the melting cyclone, such that a lengthening of a burner jet derives.

11. An apparatus according to claim 1, wherein said curved exhaust gas path of said cyclone-like separating chamber is a helical path.

12. In an apparatus for high-temperature treatment of fine-grained solids having a melting cyclone, a separating chamber in which the reaction products obtained in the melting cyclone are introduced and separated, and a transfer element connecting the melting cyclone and separating chamber, the improvement comprising:

arranging the melting cyclone above the separating chamber and connecting the transfer element to an admission opening in the separating chamber;

the transfer element being shaped to conduct the reaction products in a vertically curved downward path;

the separating chamber being a cyclone structure and holding a molten bath of liquid reaction product therein; and the admission opening being arranged above said molten bath.

13. The improvement according to claim 12, wherein said admission opening is laterally oriented.

14. The improvement according to claim 12, wherein said separating chamber comprises a syphon-like molten bath outlet providing a trap to prevent passage of exhaust gas.

15. The improvement according to claim 12, wherein the separating chamber is arranged horizontally with a horizontal axis and the admission opening is located adjacent the exhaust gas discharge opening between the melt discharge opening and the exhaust gas discharge opening lying opposite the melt discharge opening.

16. The improvement according to claim 12, wherein the separating chamber is arranged horizontally with a horizontal axis and the admission opening is located adjacent the melt discharge opening, between the melt discharge opening and the exhaust gas discharge opening.

* * * * *